(12) United States Patent
Ha et al.

(10) Patent No.: US 10,747,644 B2
(45) Date of Patent: Aug. 18, 2020

(54) METHOD OF EXECUTING INSTRUCTIONS OF CORE, METHOD OF DEBUGGING CORE SYSTEM, AND CORE SYSTEM

(71) Applicant: SAMSUNG ELECTRONICS CO., LTD., Suwon-si (KR)

(72) Inventors: Keon-soo Ha, Seoul (KR); Jung-jae Woo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 122 days.

(21) Appl. No.: 15/962,558

(22) Filed: Apr. 25, 2018

(65) Prior Publication Data

US 2019/0114249 A1    Apr. 18, 2019

(30) Foreign Application Priority Data

Oct. 13, 2017   (KR) .......................... 10-2017-0133470

(51) Int. Cl.
*G06F 11/36* (2006.01)
*G06F 11/14* (2006.01)
*G06F 11/07* (2006.01)

(52) U.S. Cl.
CPC ...... *G06F 11/3636* (2013.01); *G06F 11/0772* (2013.01); *G06F 11/1451* (2013.01); *G06F 11/3648* (2013.01)

(58) Field of Classification Search
CPC .................................. G06F 8/00; G06F 12/00
See application file for complete search history.

(56) References Cited

U.S. PATENT DOCUMENTS

| | | | |
|---|---|---|---|
| 6,681,280 B1 * | 1/2004 | Miyake | ................ G06F 9/4812 710/261 |
| 7,017,030 B2 | 3/2006 | Oldfield et al. | |
| 7,243,213 B2 | 7/2007 | Pagni et al. | |
| 8,239,838 B2 | 8/2012 | Yim et al. | |
| 9,176,733 B2 | 11/2015 | Henry et al. | |
| 9,619,345 B2 | 4/2017 | Cain et al. | |
| 9,690,642 B2 | 6/2017 | Anderson et al. | |
| 2005/0268195 A1 * | 12/2005 | Lund | ................... G06F 11/3648 714/741 |
| 2017/0031685 A1 | 2/2017 | Craske | |
| 2017/0192838 A1 | 7/2017 | Jeong et al. | |

FOREIGN PATENT DOCUMENTS

| | | |
|---|---|---|
| JP | 2010-287101 A | 12/2010 |
| KR | 10-2007-0109539 A | 11/2007 |
| KR | 10-2017-0079368 A | 7/2017 |

\* cited by examiner

*Primary Examiner* — Cheng Yuan Tseng
(74) *Attorney, Agent, or Firm* — Sughrue Mion, PLLC

(57) ABSTRACT

A method of executing an instruction of a core includes calling a first function; calling a second function in the first function; and updating a path identifier including path information of called functions based on a second function return address corresponding to where the second function ends and returns to.

20 Claims, 16 Drawing Sheets

METHOD OF EXECUTING INSTRUCTIONS OF CORE, METHOD OF DEBUGGING CORE SYSTEM, AND CORE SYSTEM

CROSS-REFERENCE TO RELATED APPLICATION

This application claims priority from Korean Patent Application No. 10-2017-0133470, filed on Oct. 13, 2017 in the Korean Intellectual Property Office, the disclosure of which is incorporated herein by reference in its entirety.

BACKGROUND

Methods and apparatuses consistent with example embodiments relate to a core system, and more particularly, to a method of executing instructions of a core, a method of collecting debugging information of the core, and a debugging method and device using the same.

In various systems including a computing system, a core executes various operations or instructions (or commands). When the core calls a function while executing instructions stored at a constantly increasing address in memory, the core jumps to the address where the function is stored and executes the function.

Various errors may occur while the core is executing instructions. A system may perform a debugging operation including an error analysis to determine the error and the cause thereof. In order to perform the debugging operation as described above, log information in which the function and the instructions are stored is required.

SUMMARY

One or more example embodiments provide a method and a device for storing information indicating a path of called functions during an operation of a core and performing a debugging operation using the information, in a core system including the core.

According to an aspect of an example embodiment, there is provided a method of executing an instruction of a core, the method including: calling a first function; calling a second function in the first function; and updating a path identifier including path information of called functions based on a second function return address corresponding to where the second function ends and returns to.

According to an aspect of another example embodiment, there is provided a core system including: a core configured to execute instructions and update a path identifier including path information of called functions when a first function is called; a non-volatile memory configured to store data for executing the instructions and the path identifier; and a debugging logic unit configured to access the non-volatile memory and read the path identifier in a debugging mode, the core being further configured to store the path identifier in the non-volatile memory in response to a backup event.

According to an aspect of yet another example embodiment, there is provided a method of debugging a core system of a debugging device, the method including: transmitting, to the core system, a debugging control signal requesting debugging information; receiving, from the core system, a path identifier including function path information corresponding to functions called by the core system; and comparing the path identifier received from the core system with a profile stored in the debugging device, and extracting the function path information from the path identifier based on the comparing.

BRIEF DESCRIPTION OF THE DRAWINGS

The above and other aspects, features and advantages of example embodiments will be more clearly understood from the following detailed description taken in conjunction with the accompanying drawings in which.

DETAILED DESCRIPTION

Figure 1:
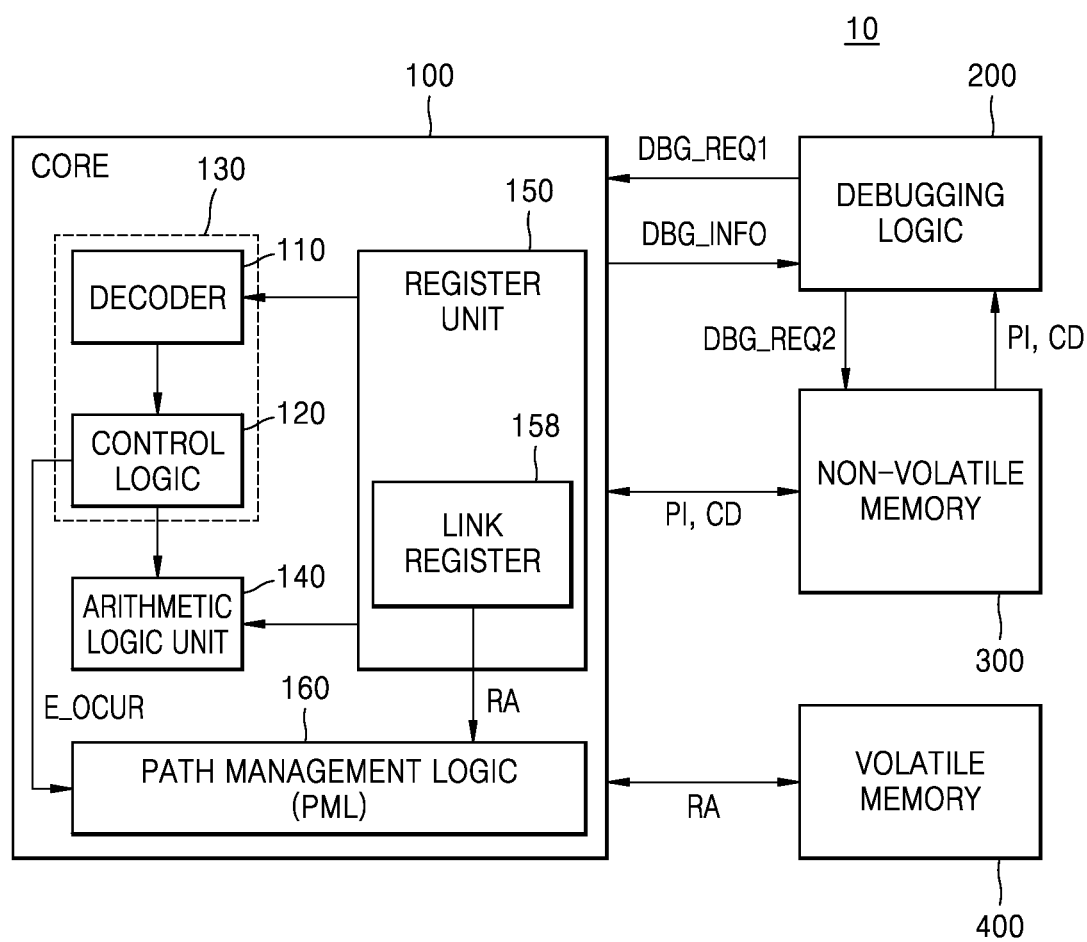
FIG. 1 is a view of a core system according to an example embodiment.

Hereinafter, example embodiments will be described in detail with reference to the accompanying drawings. As is traditional in the field, example embodiments are described and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules. Further, the blocks, units and/or modules may be physically combined into more complex blocks, units and/or modules.

FIG. 1 shows a core system 10 according to an example embodiment. The core system 10 may include a core 100, a debugging logic unit 200, a non-volatile memory 300, and a volatile memory 400.

The core 100 may include a decoder 110, a control logic unit 120, an arithmetic unit 140, a register unit 150, and a path management logic unit 160. The decoder 110 and the control logic unit 120 may be collectively referred to as a control logic unit 130.

The decoder 110 may decode an instruction received from the outside and provide the decoded instruction to the control logic unit 120. For example, the core 100 may receive an instruction from the non-volatile memory 300, which is outside the core 100, and may also receive an instruction cached in the volatile memory 400 from the volatile memory 400. Also, for example, the decoder 110 may receive an instruction from an instruction register included in the register unit 150, the instruction being received by the instruction register from an external memory, and may decode the received instruction to provide the same to the control logic unit 120. The control logic unit 120 may control an operation corresponding to the decoded instruction. For example, the control logic unit 120 may control the arithmetic unit 140 to perform a predetermined computing operation.

The register unit 150 may include a plurality of registers in which pieces of register information are stored. The pieces of register information may be stored in the registers, respectively. For example, the register unit 150 may include a link register 158 that stores a return address RA indicating where to return when a function is called. In addition to the link register 158, the register unit 150 may include at least one of an instruction register, an address register, a data register, a program counter register, a stack pointer register, and a program status register. The core 100 may execute an instruction based on pieces of register information stored in the register unit 150, and consequently may execute a program including a plurality of instructions. The register unit 150 will be described in more detail with reference to FIG. 2.

The path management logic unit 160, when functions are called while the core 100 is executing an instruction, may manage information about a path where the functions are called. For example, the path management logic unit 160 may receive the return address RA from the link register 158 of the register unit 150 and may generate and update a path identifier PI including information about a path where functions are called using the return address RA. When a backup event occurs in the core 100, the control logic unit 120 may transmit a backup event occurrence signal E_OCCUR to the path management logic unit 160 and the path management logic unit 160 may store the stored path identifier PI and a call depth CD in the non-volatile memory 300 based on the backup event occurrence signal E_OCCUR. The path identifier PI and the call depth CD stored in the non-volatile memory 300 may be provided to the debugging logic unit 200 in response to a debugging request, and may be used for a debugging operation. A more detailed operation of the path management logic unit 160 will be described with reference to the following drawings.

The debugging logic unit 200 may provide debugging information request signals DBG_REQ1 and DBG_REQ2 for requesting debugging information to the core 100 and/or the non-volatile memory 300 in response to a debugging control signal received from a host (or a debugging device) outside the core system 10. The core 100 may provide various debugging information DBG_INFO to the debugging logic unit 200 in response to the first debugging information request signal DBG_REQ1. The non-volatile memory 300 may provide the stored path identifier PI and the call depth CD to the debugging logic unit 200 in response to the second debugging information request signal DBG_REQ2. The debugging logic unit 200, as described above, may provide the debugging information request signals DBG_REQ1 and DBG_REQ2 to the core 100 and the non-volatile memory 300 based on the debugging control signal received from the external host to receive the debugging information DBG_INFO, the path identifier PI, and the call depth CD. However, example embodiments are not limited thereto. For example, the debugging logic unit 200 may provide the second debugging information request signal DBG_REQ2 to the non-volatile memory 300 at regular intervals to receive the path identifier PI and the call depth CD.

The non-volatile memory 300 may store instructions and data necessary for an operation of the core 100. The core 100 may access the non-volatile memory 300 based on address information stored in the register unit 150 and the non-volatile memory 300 may provide various instructions and/or data to the core 100. The non-volatile memory 300 may include at least one of NAND flash memory, vertical NAND (VNAND), NOR flash memory, resistive random access memory (RRAM), phase-change RAM (PRAM), magnetoresistive RAM (MRAM), ferroelectric RAM (FRAM), spin-transfer torque RAM (STT-RAM), and the like.

The volatile memory 400 stores data having high usage frequency at the time of program execution by the core 100, thereby reducing access frequency to an external memory device having a relatively slower input/output speed than the volatile memory 400. The volatile memory 400 may be implemented as a cache, and for example, the core 100 may use cached data stored in the cache 400 during program execution. The volatile memory 400 may include at least one of dynamic random access memory (DRAM), synchronous DRAM (SDRAM), double data rate (DDR) SDRAM, low power double data rate (LPDDR) SDRAM, graphics double data rate (GDDR) SDRAM, Rambus DRAM (RDRAM), static RAM (SRAM), and the like.

The core 100, the debugging logic unit 200, and the volatile memory 400 may be implemented as a single device. For example, an application processor may include the core 100, the debugging logic unit 200 and the volatile memory 400, and the core system 10 may include the application processor and the non-volatile memory 300 outside the application processor. However, example embodiments are not limited thereto. For example, the core 100, the debugging logic unit 200, the non-volatile memory 300, and the volatile memory 400 may be implemented as a single device. For example, the core 100, the debugging logic unit 200, the non-volatile memory 300, and the volatile memory 400 may be implemented on a single board.

According to an example embodiment, the path management logic unit 160 may generate and update the path identifier PI including information of functions to be called using the return address RA stored in the link register 158 in the core 100, and may also generate and update the call depth CD that represents the number of the functions called. When a backup event occurs, the path management logic unit 160 may store the path identifier PI and the call depth CD to the non-volatile memory 300 based on the backup event occurrence signal E_OCCUR provided by the control logic unit 120. The debugging logic unit 200 may provide the second debugging information request signal DBG_REQ2 to the non-volatile memory 300 according to the debugging control signal of the external host to receive the path identifier PI and the call depth CD. The debugging logic unit 200 may provide the received path identifier PI and call depth CD to the external host. The external host may obtain a path of called functions in the core 100 using the path identifier PI and call depth CD. By storing only the path identifier PI and the call depth CD including path information without storing log information of all the functions called as described above, only a small amount of the non-volatile memory 300 is used to store information necessary for debugging.

Figure 2:
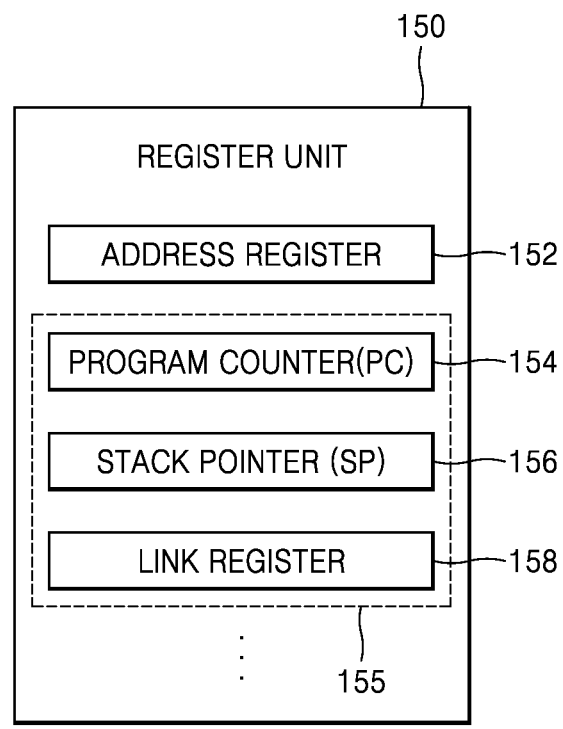
FIG. 2 is a view of a register unit according to an example embodiment.

FIG. 2 is a view of the register unit 150 according to an example embodiment. The register unit 150 may include an address register 152, a program counter register 154, a stack pointer register 156, and a link register 158. A configuration of the register unit 150 disclosed in FIG. 2 is merely an example, and the configuration of the register unit 150 may include only some of components disclosed in FIG. 2, and may further include other various kinds of registers. Also, for example, the program counter register 154, the stack pointer register 156, and the link register 158 may be registers included in one register bank 155.

When writing data to the external memory or reading data from the external memory, the address register 152 may store a value indicating an address of the data. The program counter register 154 may store a value indicating an address of an instruction that the core is currently executing. The stack pointer register 156 may store an address of last pushed data in a currently used stack area.

In instruction execution of a core, an address where instructions to be executed by the core are stored may constantly increase, and a value stored in the program counter register 154 may sequentially increase. However, a case where the address where instructions to be executed by the core are stored is not constantly increased, but instead jumps to another address, may also occur. Jumping to an address where instructions are stored may be referred to as address jumping. For example, if a function is called while instructions are being executed, an address jump to an address where instructions are stored may be performed. The link register 158 may store a return address indicating an address of a location where the function ends and returns.

According to an example embodiment, a core may generate a path identifier including path information of the called functions by using a return address stored in the link register 158 when functions are called. For example, referring to FIG. 1, when functions are called, the path management logic unit 160 in the core 100 may receive the return address RA stored in the link register 158 from the link register 158, and may generate or update the path identifier PI using the return address RA. A plurality of functions may be called while the core 100 is executing instructions. For example, a first function may be called, and a second function may be called in the first function. The path management logic unit 160 may generate a path identifier using a return address stored in the link register 158 when the first function is called, and may update the path identifier using the return address stored in the link register 158 when the second function is called. It is possible to reduce capacity of a non-volatile memory consumed in storing debugging information by simplifying and storing path information of called functions by using a return address.

Figure 3:
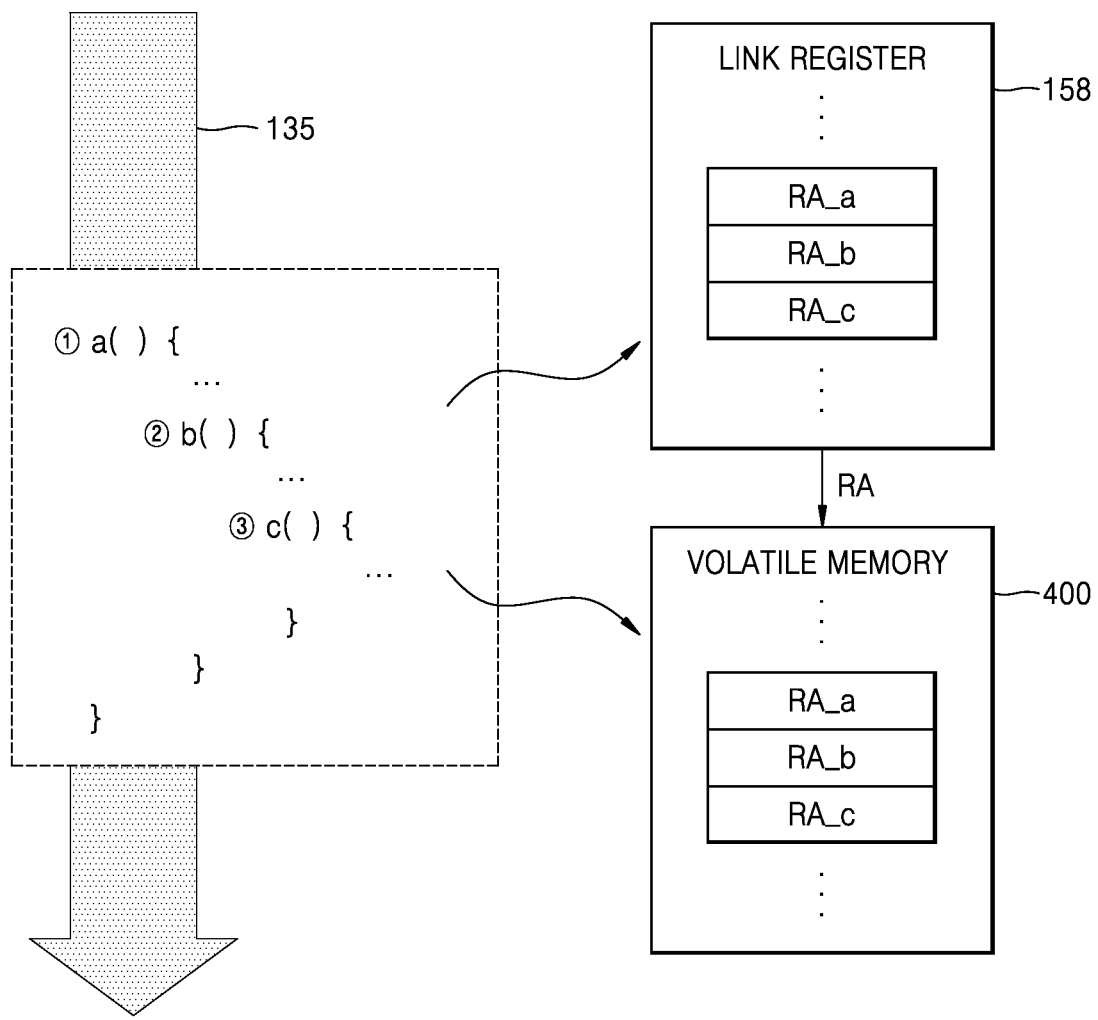
FIG. 3 is a view of an instruction execution process according to an example embodiment.

FIG. 3 is a view of an instruction execution process 135 according to an example embodiment. A core may sequentially execute a plurality of instructions. Furthermore, a function may be called during the instruction execution process 135 during which the core executes the plurality of instructions. FIG. 3 shows an example process in which an a( ) function is called during the instruction execution process 135, a b( ) function is called in the a( ) function, and a c( ) function is called in the b( ) function.

The a( ) function may be called during the instruction execution process 135 of the core (①). When the a( ) function is called, an address jump may occur. Therefore, when the a( ) function is called, a first return address RA_a indicating an address of a location where the a( ) function ends and returns may be stored in the link register 158. The link register 158 may transmit the first return address RA_a to the volatile memory 400 and the volatile memory 400 may store the first return address RA_a.

The b( ) function may be called during an instruction execution process in the a( ) function (②). When the b( ) function is called, another address jump may occur. Therefore, when the b( ) function is called, a second return address RA_b indicating an address of a location where the b( ) function ends and returns may be stored in the link register 158. The link register 158 may transmit the second return address RA_b to the volatile memory 400 and the volatile memory 400 may store the second return address RA_b.

The c( ) function may be called during an instruction execution process in the b( ) function (③). When the c( ) function is called, another address jump may occur. Therefore, when the c( ) function is called, a third return address RA_c indicating an address of a location where the c( ) function ends and returns may be stored in the link register 158. The link register 158 may transmit the third return address RA_c to the volatile memory 400 and the volatile memory 400 may store the third return address RA_c.

When a plurality of functions are called as shown in FIG. 3, a debugging device outside a core may need to perform a debugging operation on instruction execution of the core during or after the instruction execution. For the debugging operation, the core may store path information of the called functions in a non-volatile memory. The path information may include information about a list and an order of the called functions. In a case where log information, such as an argument or a return value, of the called functions are stored or all the return addresses RA_a, RA_b, and RA_c are stored when the path information of the called functions are stored in the non-volatile memory, a large capacity of the non-volatile memory may be used. The core may generate and update a path identifier using a small capacity of the non-volatile memory to store the path information of the called functions. For example, referring to FIG. 1, the path management logic unit 160 may generate and update the path identifier PI using the return address RA. The generation and update of the path identifier PI will be described in more detail below with reference to the following drawings.

Figure 4:
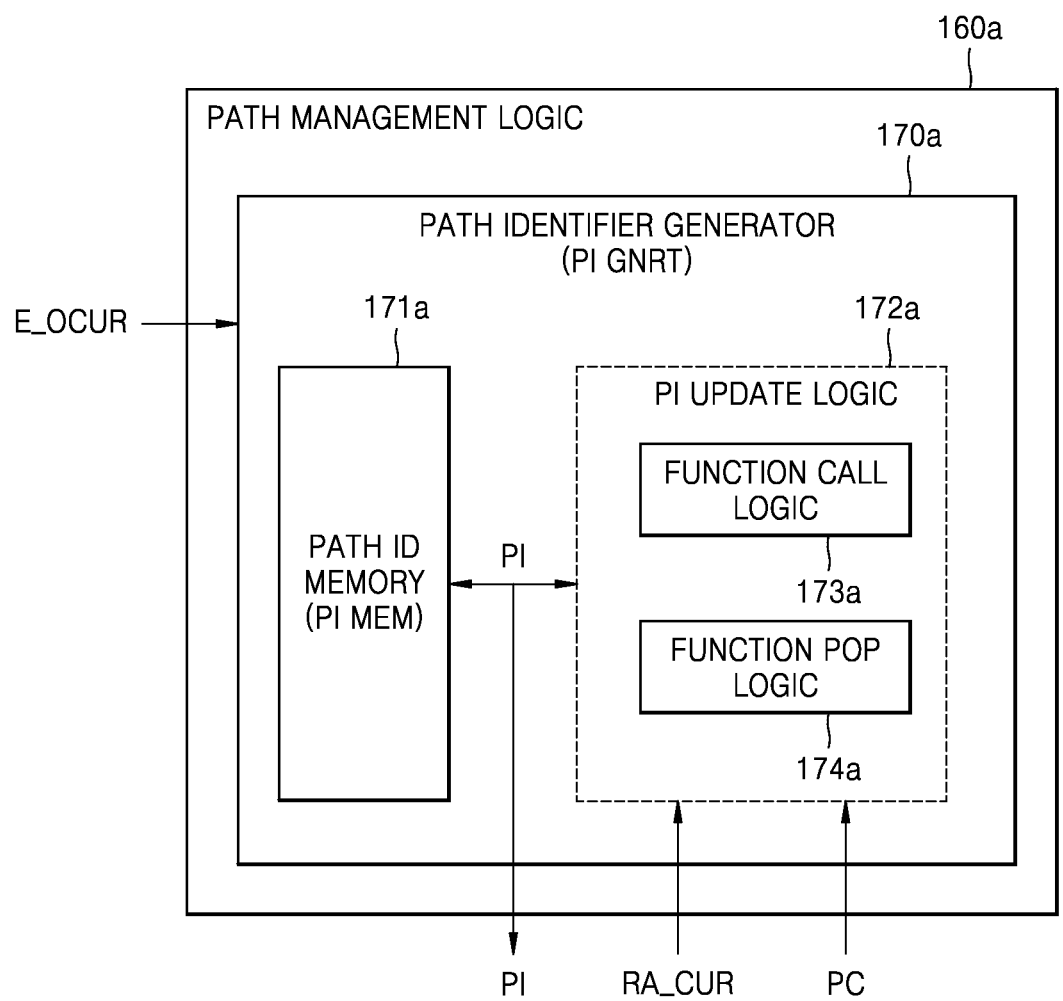
FIG. 4 is a view of a path management logic unit according to an example embodiment.

FIG. 4 is a view of a path management logic unit 160a according to an example embodiment. The path management logic unit 160a may include a path identifier generator 170a.

The path identifier generator 170a may include a path identifier memory 171a and a path identifier update logic unit 172a. The path identifier update logic unit 172a may include a function call logic unit 173a and a function pop logic unit 174a. The path identifier generator 170a may generate or update the path identifier PI when a function is called or a called function ends. The path identifier generator 170a may be implemented in any combination of hardware, software, and firmware.

The path identifier memory 171a may store the path identifier PI. The path identifier memory 171a may provide the path identifier PI stored in the path identifier memory 171a to the path identifier update logic unit 172a when a new function is called or a called function ends. The path identifier memory 171a may receive the path identifier PI updated by the path identifier update logic unit 172a and may store the updated path identifier PI. For example, when receiving the updated path identifier PI, the path identifier memory 171a may remove the path identifier PI previously stored in the path identifier memory 171a and store the updated path identifier PI. The path identifier generator 170a may receive the backup event occurrence signal E_OCCUR from a control logic unit in a core. When the backup event occurrence signal E_OCCUR indicates occurrence of a backup event, the path identifier memory 171a may transmit the path identifier PI stored in the path identifier memory 171a to a non-volatile memory outside the core and store the same.

The path identifier update logic unit 172a may receive a return address RA_CUR of a currently called function or an ended function and a PC value stored in a program counter register. If an instruction stored in an address according to the PC value indicates a "function call", the path identifier PI may be updated by the function call logic unit 173a in the path identifier update logic unit 172a. If an instruction stored in an address according to the PC value indicates a "function end", the path identifier PI may be updated by the function pop logic unit 174a in the path identifier update logic unit 172a.

When a function is called, the function call logic unit 173a may update the path identifier PI received from the path identifier memory 171a using the return address RA_CUR of a currently called function. For example, the function call logic unit 173a may generate an updated path identifier PI by performing a first arithmetic operation on the path identifier PI received from the path identifier memory 171a and the return address RA_CUR. For example, the function call logic unit 173a may generate an updated path identifier PI by performing an operation of adding the path identifier PI received from the path identifier memory 171a and the return address RA_CUR.

When the called function ends, the function call logic unit 173a may update the path identifier PI received from the path identifier memory 171a using the return address RA_CUR of a currently ended function. For example, the function pop logic unit 174a may generate an updated path identifier PI by performing a second arithmetic operation on the path identifier PI received from the path identifier memory 171a and the return address RA_CUR. The second arithmetic operation may be an inverse operation of the first arithmetic operation. For example, the function call logic unit 173a may generate an updated path identifier PI by performing an operation of subtracting the return address RA_CUR from the path identifier PI received from the path identifier memory 171a.

Figure 5:
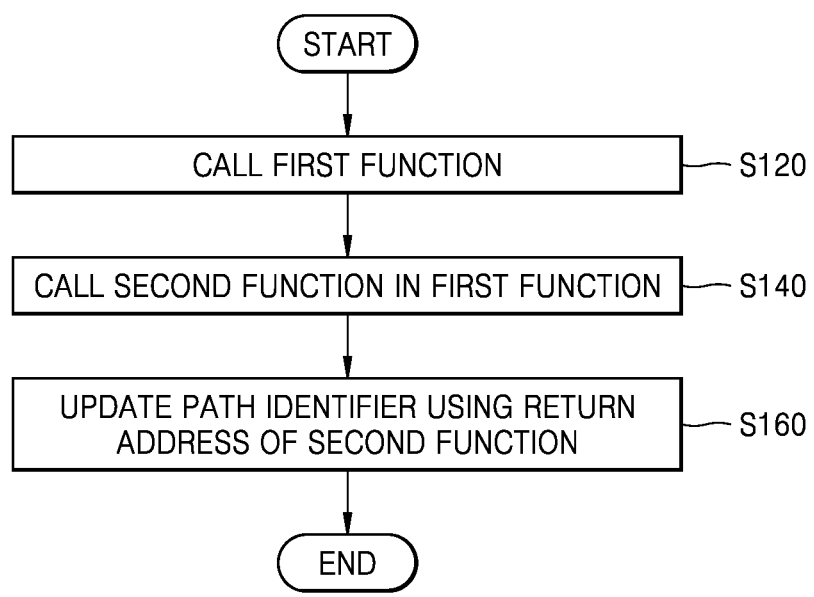
FIG. 5 is a flowchart of instruction execution of a core according to an example embodiment.

FIG. 5 is a flowchart of instruction execution of a core according to an example embodiment. FIG. 5 shows an example embodiment in which a plurality of functions are called. In particular, FIG. 5 shows a flowchart of instruction execution of a core when a first function is called and then a second function is called. FIG. 5 may be described with reference to the core system 10 of FIG. 1.

In operation S120, the core 100 may call the first function during the instruction execution. The core 100 may execute at least one instruction in the first function, but is not limited thereto. The core 100 may proceed to the next operation after the first function call (operation S120) without another instruction execution.

In operation S140, after the first function is called during the operation of the core 100, the second function may be called in the first function before the first function ends. When the second function is called, the link register 158 may store a return address of the second function which indicates a location at which the second function ends and returns. The core 100 may store the return address of the second function in the volatile memory 400 outside the core 100. However, example embodiments are not limited thereto. When there is a memory capable of performing a cache function in the core 100, the core 100 may store the return address of the second function in the memory performing the cache function in the core 100.

In operation S160, the core 100 may update the path identifier PI stored in the core 100 using the return address of the second function. For example, the path management logic unit 160 in the core 100 may generate an updated path identifier PI by performing an arithmetic operation on the path identifier PI stored in the path management logic unit 160 and the return address of the second function. For example, the path management logic unit 160 in the core 100 may generate an updated path identifier PI by performing an operation of adding the path identifier PI stored in the path management logic unit 160 and the return address of the second function.

The core 100 may update the call depth CD by increasing the call depth CD stored in the core 100 by 1 after calling the second function. The call depth will be described in more detail with reference to FIGS. 6 and 7.

A method of executing an instruction of the core 100 may further include an operation of ending the second function, and the core 100 may update a path identifier and a call depth using the return address of the second function when the second function ends. For example, the path management logic unit 160 may generate an updated path identifier by performing an operation of subtracting the return address of the second function from a path identifier stored in the path management logic unit 160, and may reduce the stored call depth by 1.

When a backup event occurs, the core 100 may store a path identifier stored in the core 100 in the non-volatile memory 300 outside the core 100 before the backup event occurs. The backup event may include different types of backup events, which will be described in more detail with reference to FIGS. 9A, 9B and 9C.

Figure 6:
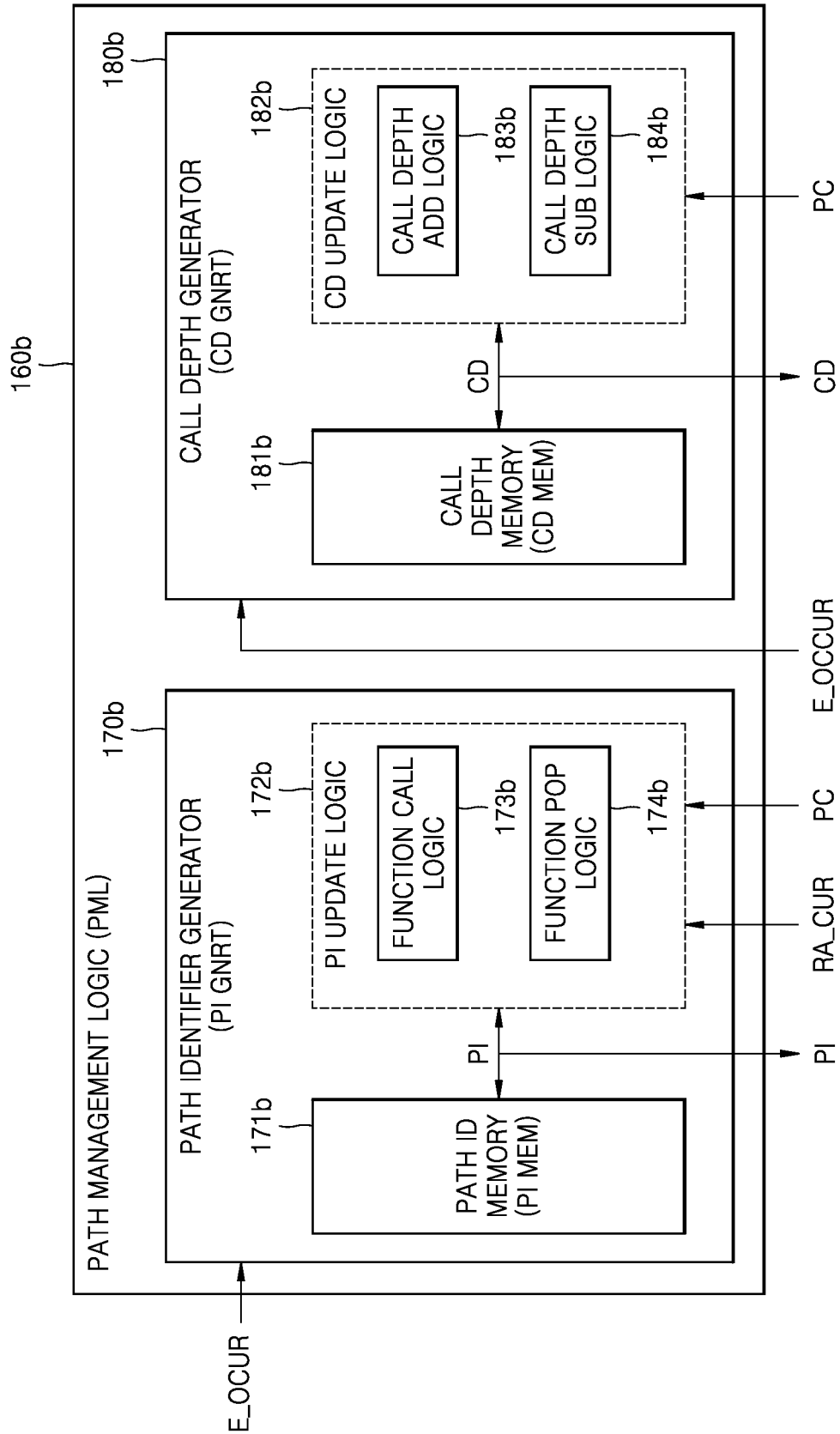
FIG. 6 is a view of a path management logic unit according to an example embodiment.

FIG. 6 is a view of a path management logic unit 160b according to an example embodiment. The path management logic unit 160b may include a path identifier generator 170b and a call depth generator 180b. Repeated descriptions of the path identifier generator 170b, which is the same as that of FIG. 4, will not be given herein.

The call depth generator 180b may include a call depth memory 181b and a call depth update logic unit 182b. The call depth update logic unit 182b may include a call depth addition logic unit 183b and a call depth subtraction logic unit 184b. The call depth generator 180b may generate or update a call depth when a function is called or ends in a core. The call depth generator 180b may be implemented in any combination of hardware, software, and firmware.

The call depth memory 181b may store a call depth. When a new function is called or a called function ends, call depth memory 181b may provide the call depth CD stored in call depth memory 181b to the call depth update logic unit 182b. The call depth memory 181b may receive a call depth CD updated by the call depth update logic unit 182b and may store the updated call depth CD. For example, when receiving the updated call depth CD, the call depth memory 181b may remove the call depth CD previously stored in the call depth memory 181b and store the updated call depth CD. The call depth generator 180b may receive the backup event occurrence signal E_OCCUR from a control logic unit in a core. When the backup event occurrence signal E_OCCUR indicates occurrence of a backup event, the call depth memory 181b may transmit the call depth CD stored in the call depth memory 181b to a non-volatile memory outside the core and store the same.

The call depth update logic unit 182b may receive a PC value stored in a program counter register. If an instruction stored in an address according to the PC value indicates a "function call", the call depth CD may be updated by the call depth addition logic unit 183b in the call depth update logic unit 182b. If an instruction stored in an address according to the PC value indicates a "function end", the call depth CD may be updated by the call depth subtraction logic unit 184b in the call depth update logic unit 182b.

When a function is called, the call depth addition logic unit 183b may increase the call depth CD received from the call depth memory 181b by 1 to generate an updated call depth CD.

When the called function ends, the call depth subtraction logic unit 184b may reduce the call depth CD received from the call depth memory 181b by 1 to generate an updated call depth CD.

According to an example embodiment consistent with FIG. 6, the path management logic unit 160b in the core performs both an update operation of a path identifier every time a function is called or ends and an update operation of a call depth so that the path identifier and the call depth may be provided to a non-volatile memory when a backup event occurs. The path identifier and the call depth stored in the non-volatile memory at the request of a debugging device may be transmitted to the debugging device. The debugging device may extract path information of called functions by using the call depth as well as the path identifier. Reliability of the path information extraction may be improved by additionally using the call depth.

Figure 7:
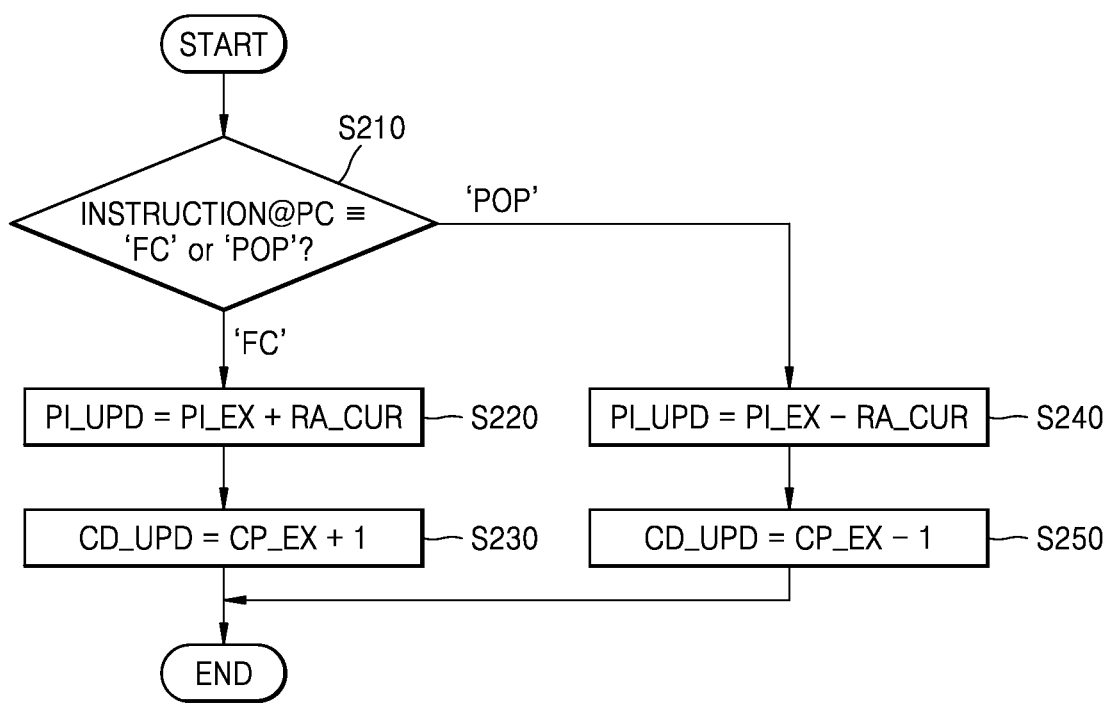
FIG. 7 is a flowchart of updating execution of a path management logic unit according to an example embodiment.

FIG. 7 is a flowchart of updating execution of a path management logic unit according to an example embodiment. FIG. 7 may be described with reference to FIG. 6.

In operation S210, the path management logic unit 160b may determine whether an instruction stored in a location corresponding to a received current PC value indicates a function call FC or a function end POP. In the following, a path identifier and a call depth may be updated by dividing a case (INSTRUCTION @ PC≡'FC') where a function is called and a case (INSTRUCTION @ PC≡'POP') where the called function ends.

In operation S220, when an instruction stored in a location corresponding to a current PC value indicates a function call FC, a function call logic unit 173b in the path identifier generator 170b adds the return address RA_CUR of a currently called function to a path identifier PI_EX stored in a path identifier memory 171b to generate an updated path identifier PI_UPD. In operation S230, the call depth addition logic unit 183b in the call depth generator 180b may add one to a call depth CD_EX stored in the call depth memory 181b to generate an updated call depth CD_UPD.

In operation S240, when the instruction stored in the location corresponding to the current PC value indicates the function end POP, a function pop logic unit 174b in the path identifier generator 170b may subtract the return address RA_CUR of a currently ended function from the path identifier PI_EX stored in the path identifier memory 171b to generate the updated path identifier PI_UPD. In operation S250, the call depth subtraction logic unit 184b in the call depth generator 180b may subtract one from the call depth CD_EX stored in the call depth memory 181b to generate the updated call depth CD_UPD.

Figure 8:
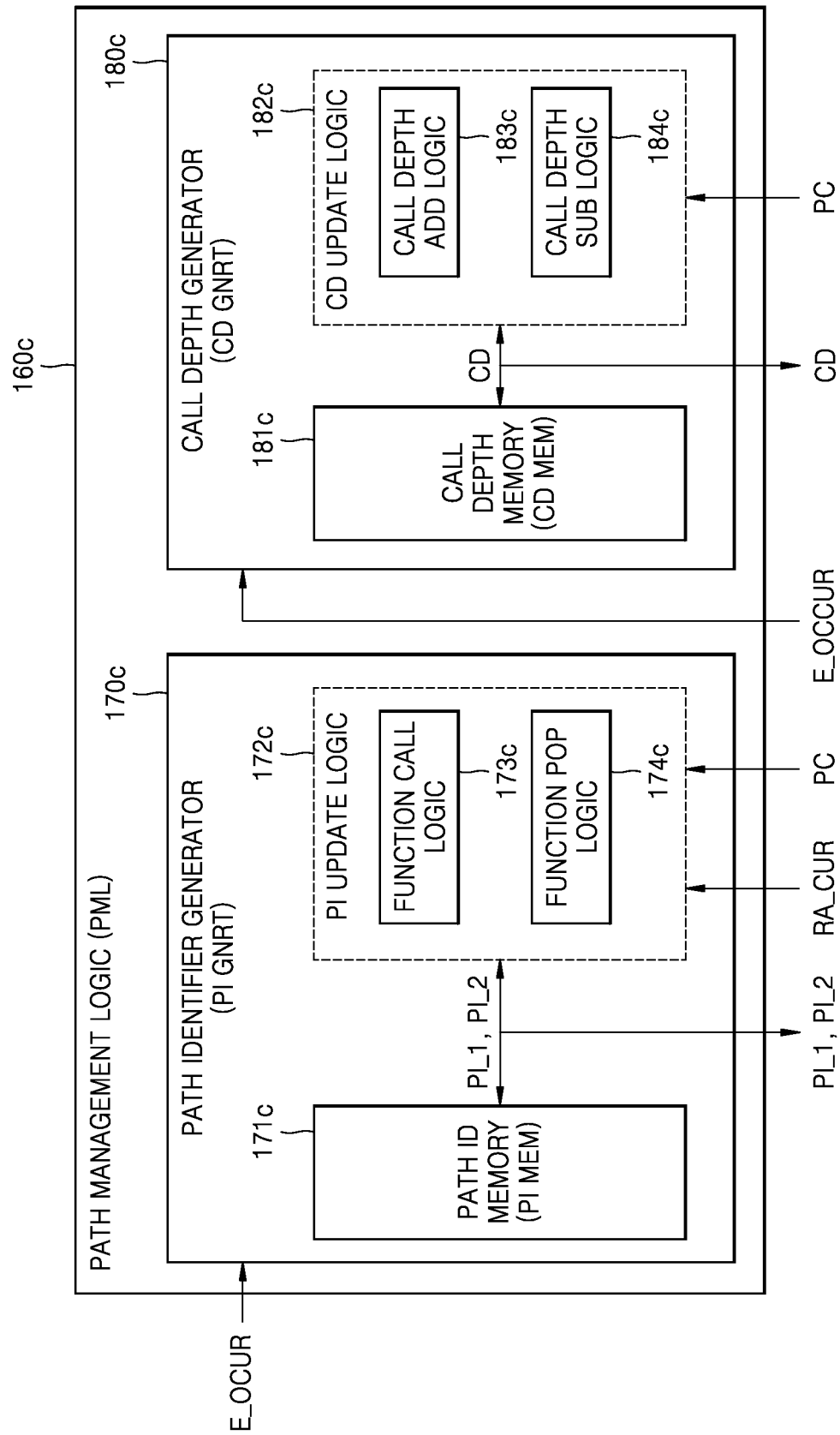
FIG. 8 is a view of a path management logic according to an example embodiment.

FIG. 8 is a view of a path management logic unit 160c according to an example embodiment. The path management logic unit 160c may include a path identifier generator 170c and a call depth generator 180c. Repeated descriptions of the path identifier generator 170c and the call depth generator 180c, which are the same as those of FIGS. 4 and 6, will not be given herein.

The path identifier generator 170c illustrated in FIG. 8 may manage a first path identifier PI_1 using a first operation and a second path identifier PI_2 using a second operation.

For example, when a function is called, a function call logic unit 173c may perform a first operation on the first path identifier PI_1 received from a path identifier memory 171c and the return address RA_CUR of the called function to generate an updated first path identifier PI_1, and may perform a second operation on the second path identifier PI_2 received from the path identifier memory 171c and the return address RA_CUR of the called function to generate an updated second path identifier PI_2.

In addition, for example, when the called function ends, a function pop logic unit 174c may perform a third operation on the first path identifier PI_1 received from the path identifier memory 171c and the return address RA_CUR of the ended function to generate the updated first path identifier PI_1, and may perform a fourth operation on the second path identifier PI_2 received from the path identifier memory 171c and the return address RA_CUR of the ended function to generate the updated second path identifier PI_2. The third operation may be an inverse operation of the first operation, and the fourth operation may be an inverse operation of the second operation.

The path identifier memory 171c may store the first path identifier PI_1 and the second path identifier PI_2 that are updated as described above. The path identifier memory 171c may store the stored first path identifier PI_1 and the stored second path identifier PI_2 in a non-volatile memory based on the backup event occurrence signal E_OCCUR received from the outside (e.g., a control logic unit).

In an example embodiment consistent with FIG. 8, first path identifier PI_1 and the second path identifier PI_2 may be used instead of one path identifier, and a debugging device may extract path information of called functions by using the first path identifier PI_1, the second path identifier PI_2, and the call depth CD. Reliability of the path information extraction may be improved by extracting the path information using a plurality of path identifiers.

Figure 9A:
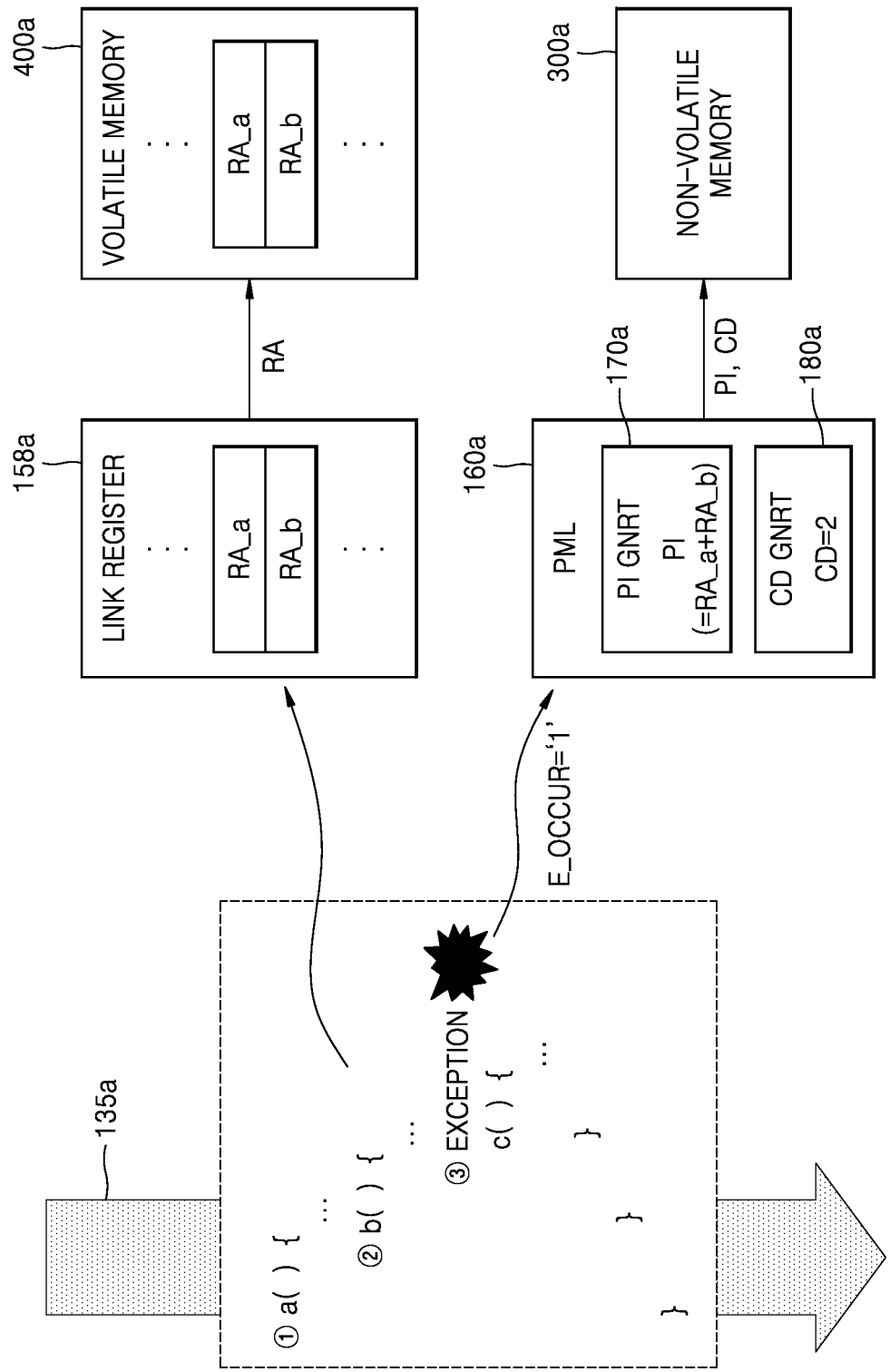
FIG. 9A is a view of an instruction execution process according to an example embodiment.

FIG. 9A is a view of an instruction execution process 135a according to an example embodiment. A core may sequentially execute a plurality of instructions. Furthermore, a plurality of functions may be called during the instruction execution process 135a during which the core executes the plurality of instructions. FIG. 9A shows an example process in which an exception EXCEPTION occurs before a c( ) function is called during the instruction execution process 135a. As shown, a b( ) function is called in the a( ) function, and a c( ) function is called in the b( ) function. The EXCEPTION described in FIG. 9A is only for convenience of explanation and the description of FIG. 9A may be applied in all cases where the EXCEPTION occurs while calling a function.

The a( ) function may be called during the instruction execution process 135a of the core (①). When the a( ) function is called, the first return address RA_a may be stored in a link register 158a and a volatile memory 400a. The path management logic unit 160a may generate the path identifier PI by initializing the same to the first return address RA_a and initialize the call depth CD to 1.

The b( ) function may be called in the a( ) function (②). When the b( ) function is called, the second return address RA_b may be stored in the link register 158a and the volatile memory 400a. In addition, the path management logic unit 160a may update the path identifier PI by adding the second return address RA_b to the previously stored path identifier PI. Although the operation is described as being a sum operation, example embodiments are not limited thereto and various arithmetic operations may be used. The path management logic unit 160a may update the call depth CD by 1 to 2.

The EXCEPTION may occur before the c( ) function is called in the b( ) function. The EXCEPTION may include a case where an error occurs in hardware or software during instruction execution and/or a case where a core enters a specific operation mode due to an external request. The specific operation mode of the core may include, but is not limited to, an interrupt request (IRQ) mode, a fast interrupt request (FIQ) mode, a supervisor call (SVC) mode, and an ABorT (ABT) mode. If the EXCEPTION occurs in a function, it may be determined that a backup event of a first type has occurred.

When the backup event of the first type occurs, an external host (or a debugging device) may perform a debugging operation on instruction execution of a core before the occurrence of the backup event of the first type. Therefore, a control logic unit in the core may transmit the backup event occurrence signal E_OCCUR to the path management logic unit 160a. The path management logic unit 160a may store the stored path identifier PI and the call depth CD in a non-volatile memory 300a outside the core based on the reception of the backup event occurrence signal E_OCCUR. The stored path identifier PI may be a sum of the first return address RA_a and the second return address RA_b, and the stored call depth CD may be 2.

When the EXCEPTION occurs as such, that is, when the backup event of the first type occurs, a core may store the path identifier PI including path information of called functions and the call depth CD indicating the number of the called functions in a non-volatile memory until the EXCEPTION occurs. The host (or the debugging device) outside the core may obtain the stored path identifier PI and the call depth CD from the non-volatile memory and use them to extract the path information of the called functions until the EXCEPTION occurs.

Figure 9B:
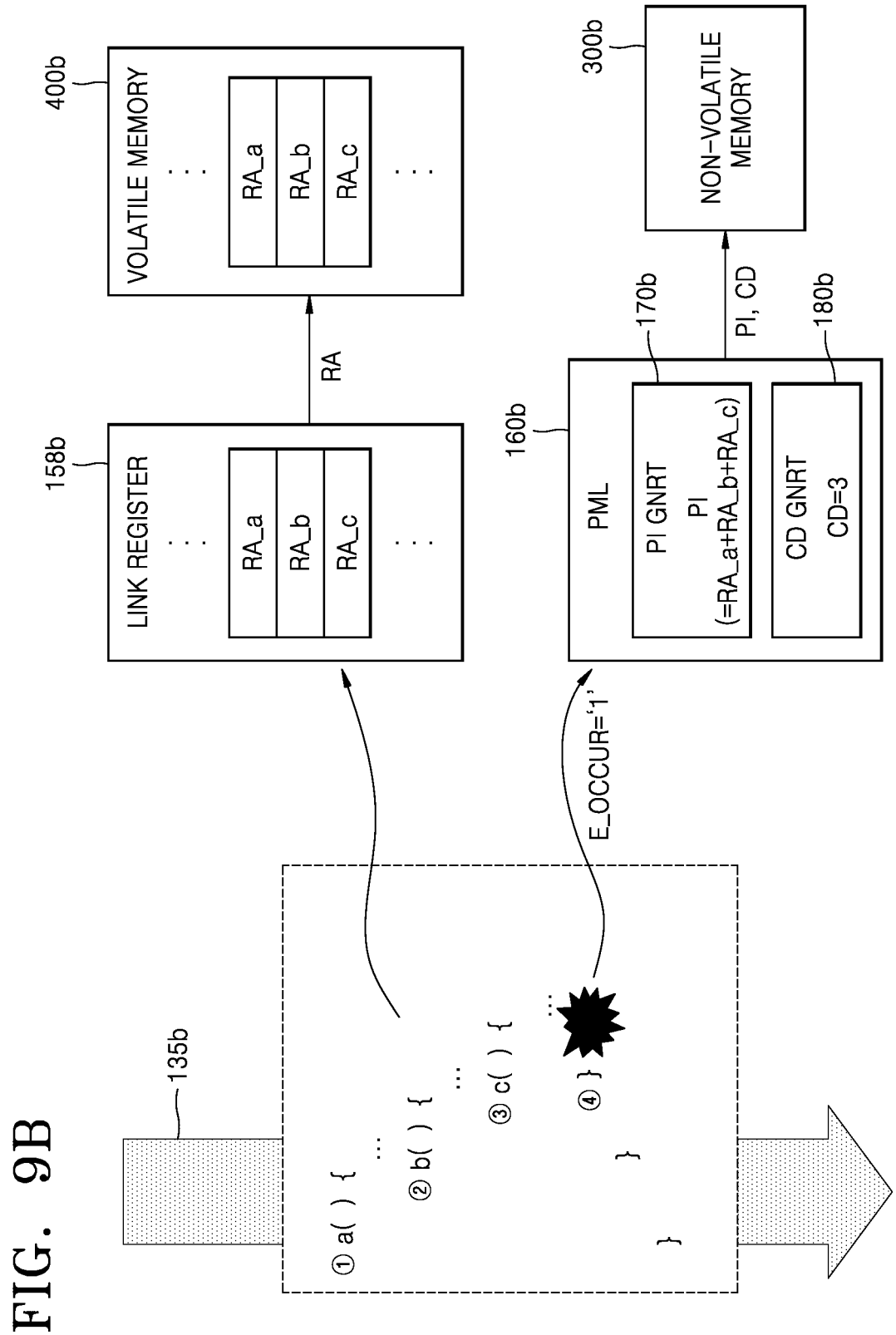
FIG. 9B is a view of an instruction execution process according to an example embodiment.

FIG. 9B is a view of an instruction execution process 135b according to an example embodiment. A core may sequentially execute a plurality of instructions. Furthermore, a plurality of functions may be called during the instruction execution process 135b during which the core executes the plurality of instructions. FIG. 9B shows an example process in which an a( ) function is called during the instruction execution process 135b, a b( ) function is called in the a( ) function, and a c( ) function is called in the b( ) function. The condition described in FIG. 9B is only for convenience of explanation and the description of FIG. 9B may be applied in all cases where more than one function is called.

The a( ) function may be called during the instruction execution process 135b of the core (①). When the a( ) function is called, the first return address RA_a may be stored in a link register 158b and a volatile memory 400b. The path management logic unit 160b may generate the path identifier PI by initializing the same to the first return address RA_a and initialize the call depth CD to 1.

The b( ) function may be called in the a( ) function (②). When the a( ) function is called, the second return address RA_b may be stored in the link register 158b and the volatile memory 400b. In addition, the path management logic unit 160b may update the path identifier PI by adding the second return address RA_b to the previously stored path identifier PI. Although the operation is described as being a sum operation, example embodiments are not limited thereto and various arithmetic operations may be used. The path management logic unit 160b may update the call depth CD by 1 to 2.

The c( ) function may be called in the b( ) function (③). When the c( ) function is called, the third return address RA_c may be stored in the link register 158b and the volatile memory 400b. In addition, the path management logic unit 160b may update the path identifier PI by adding the third return address RA_c to the previously stored path identifier PI. The path management logic unit 160b may update the call depth CD by 1 to 3.

The c( ) function may end without calling another function in the c( ) function (④). When a function ends without calling another function in a specific function, the specific function may be referred to as a leaf function. When the leaf function ends in this way, it can be said that a backup event of a second type has occurred.

When the backup event of the second type occurs, a control logic unit in a core may transmit the backup event occurrence signal E_OCCUR to the path management logic unit 160b. The path management logic unit 160b may store the stored path identifier PI and the call depth CD in a non-volatile memory 300b outside the core based on the reception of the backup event occurrence signal E_OCCUR. Here, the stored path identifier PI may be a sum of the first return address RA_a, the second return address RA_b, and the third return address RA_c, and the stored call depth CD may be 3.

When the leaf function ends as such, that is, when the backup event of the second type occurs, a core may store the path identifier PI including path information of called functions and the call depth CD indicating the number of the called functions in a non-volatile memory until the leaf function ends. The host (or the debugging device) outside the core may obtain the stored path identifier PI and the call depth CD from the non-volatile memory and use them to extract the path information of the called functions until the leaf function ends.

Figure 9C:
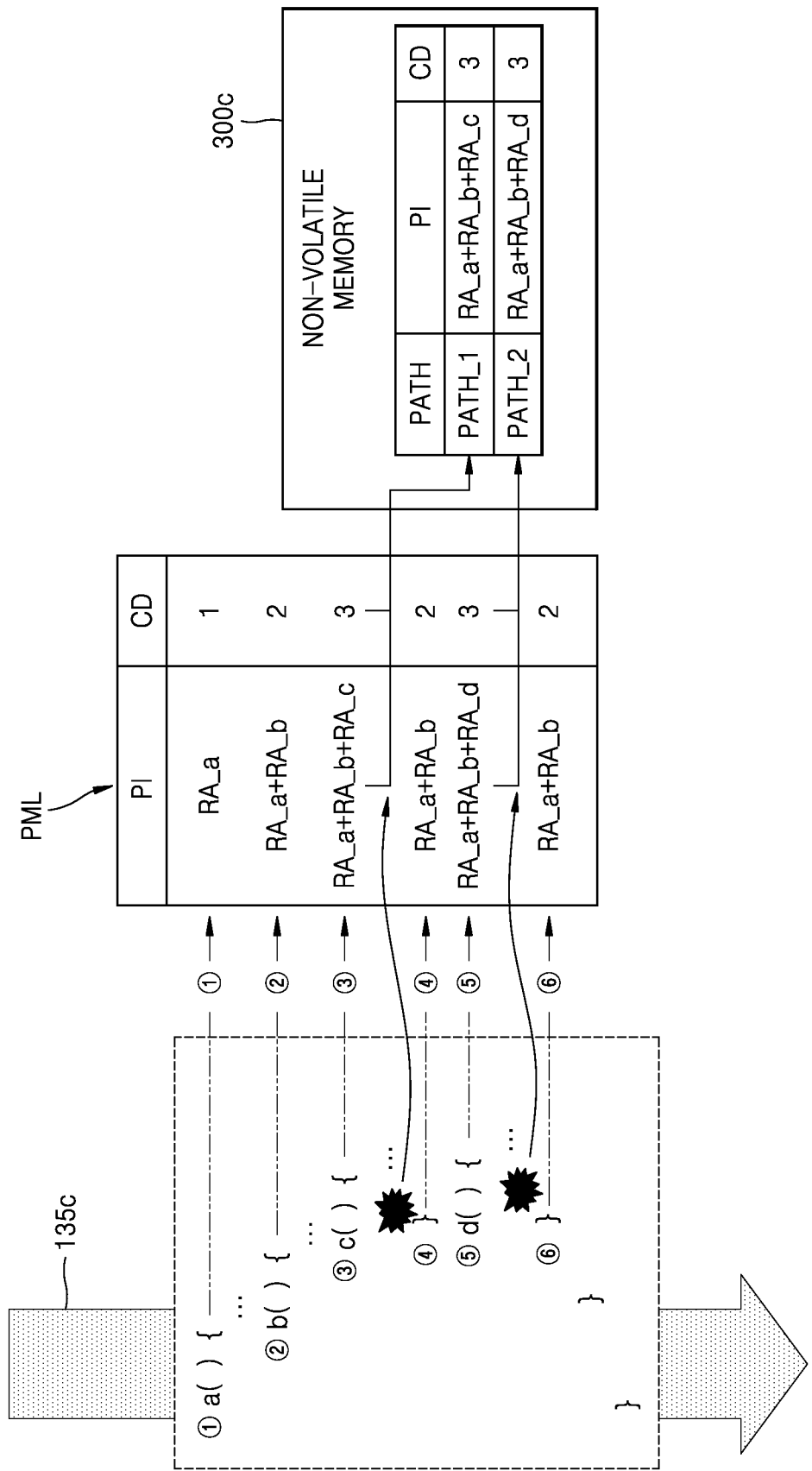
FIG. 9C is a view of an instruction execution process according to an example embodiment.

FIG. 9C is a view of an instruction execution process 135c according to an example embodiment. A core may sequentially execute a plurality of instructions. Furthermore, a plurality of functions may be called during the instruction execution process 135c during which the core executes the plurality of instructions. FIG. 9C shows an example process in which the a( ) function is called during the instruction execution process 135c, the b( ) function is called in the a( ) function, and the c( ) function is called in the b( ) function after the c( ) function ends. The condition described in FIG. 9C is only for convenience of explanation and the description of FIG. 9C may be applied in all cases where a plurality of functions are called in one function. The description of FIG. 9B will be referred to occurrence of a backup event in which the c( ) function ends after the a( ), b( ) and c( ) functions are called.

When the c( ) function ends (④), a path management logic unit may store the path identifier PI and the call depth CD stored before the end of the c( ) function in the non-volatile memory 300c. For example, the non-volatile memory 300c may store a value of RA_a+RA_b+RA_c in the path identifier PI corresponding to a first path PATH_1, and may store a value of 3 in the call depth CD corresponding to the first path PATH_1. When the c( ) function ends (④), the path management logic unit may also update the path identifier PI and the call depth CD. The path management logic unit may generate an updated path identifier RA_a+RA_b by subtracting a return address of the ended c( ) function from the previous path identifier RA_a+RA_b+RA_c, and may generate an updated call depth of 2 by subtracting 1 from the previous call depth of 3.

The c( ) function may end and a d( ) function may be called in the b( ) function (⑤). When the d( ) function is called, a fourth return address RA_d may be stored in a link register and a volatile memory. In addition, the path management logic unit may update a path identifier by adding the fourth return address RA_d to the previously stored path identifier. The path management logic unit may update the call depth to 3 by adding 1 to the call depth.

The d( ) function may end without calling another function in the d( ) function (⑥). That is, the d( ) function may correspond to a leaf function, and the end of the d( ) function may also correspond to the second type of backup event.

When the d( ) function ends (⑥), the path management logic unit may store the path identifier PI and the call depth CD stored before the end of the d( ) function in the non-volatile memory 300c. For example, the non-volatile memory 300c may store the value of RA_a+RA_b+RA_c in the path identifier PI corresponding to a second path PATH_2, and may store a value of 3 in the call depth CD corresponding to the second path PATH_2. When the d( ) function ends (⑥), the path management logic unit may also update the path identifier PI and the call depth CD. The path management logic unit may generate the updated path identifier RA_a+RA_b by subtracting a return address of the ended d( ) function from a previous path identifier RA_a+RA_b+RA_d, and may generate the updated call depth of 2 by subtracting 1 from the previous call depth of 3.

As such, when the c( ) function and the d( ) function are respectively called in the b( ) function, a path identifier PI and a call depth CD for the first path PATH_1 including the a( ) function, the b( ) function, and the c( ) function may be stored, and a path identifier PI and a call depth CD for the second path PATH_2 including the a( ) function, the b( ) function, and the d( ) function may be stored.

Figure 10:
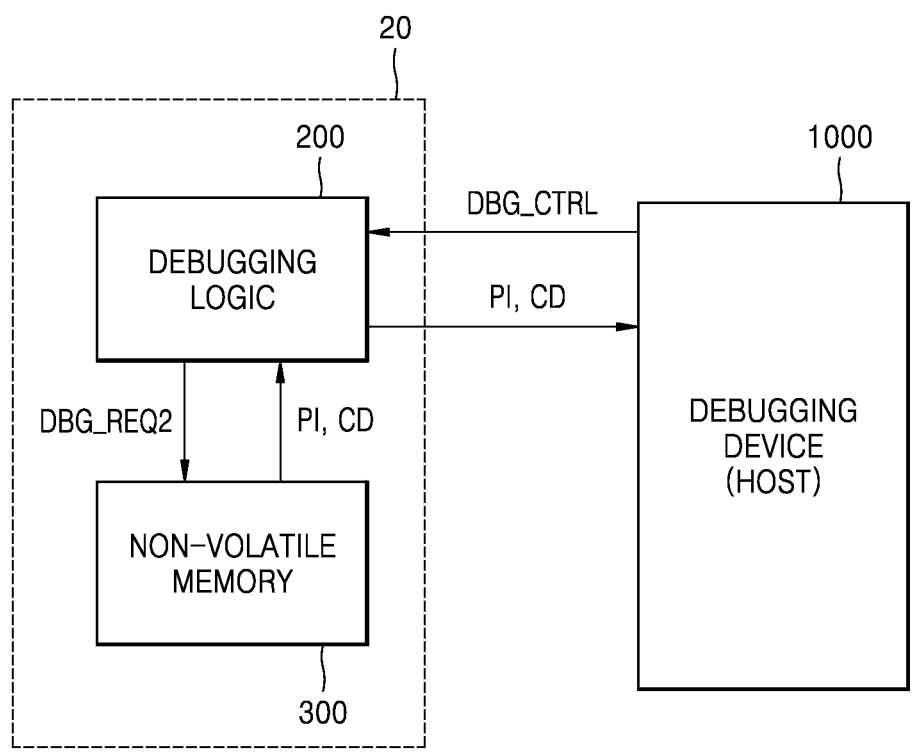
FIG. 10 is a view of a core system and a debugging device according to an example embodiment.

FIG. 10 is a view of a core system 20 and a debugging device 1000 according to an example embodiment. The core system 20 may include the debugging logic unit 200 and the non-volatile memory 300, which merely discloses a configuration required for the description, but may additionally include any other components. Repeated descriptions of the core system 20, which is the same as that of FIGS. 1 to 9C, will not be given herein.

The debugging device 1000 may provide a debugging control signal DBG_CTRL to the core system 20 when the debugging device 1000 desires to perform a debugging operation on instruction execution of a core in the core system 20. However, this is an example, and the debugging device 1000 may periodically receive information necessary for debugging from the core system 20. According to an example embodiment, the debugging device 1000 may receive the path identifier PI including path information of functions called while the instructions are executed and the call depth CD indicating the number of the called functions from the core system 20 The debugging device 1000 may extract the path information of the called functions by using the received path identifier PI and the call depth CD. Extraction of the path information of the debugging device 1000 will be described in more detail with reference to FIGS. 11 and 12.

The debugging logic unit 200 may transmit the second debugging information request signal DBG_REQ2 to the non-volatile memory 300 based on the debugging control signal DBG_CTRL received from the debugging device 1000. The debugging logic unit 200 may access the non-volatile memory 300 based on the second debugging information request signal DBG_REQ2 to obtain the path identifier PI and the call depth CD. The debugging logic unit 200 may transmit the obtained path identifier PI and the call depth CD to the debugging device 1000. However, this is an example operation, and the debugging logic unit 200 may obtain a path identifier PI and a call depth CD corresponding to a stored path from the non-volatile memory 300 at regular intervals.

A path identifier PI and a call depth CD corresponding to a path of the functions called during the instruction execution of the core may be stored in the non-volatile memory 300. For example, the core in the core system 20 may store the stored path identifier PI and the call depth CD in the non-volatile memory 300 when a backup event corresponding to FIGS. 9A to 9C.

The debugging device 1000 extracts the path information of the called functions by using the path identifier PI and the call depth CD, which are simplified data, thereby reducing capacity of the non-volatile memory 300 used for debugging.

Figure 11:
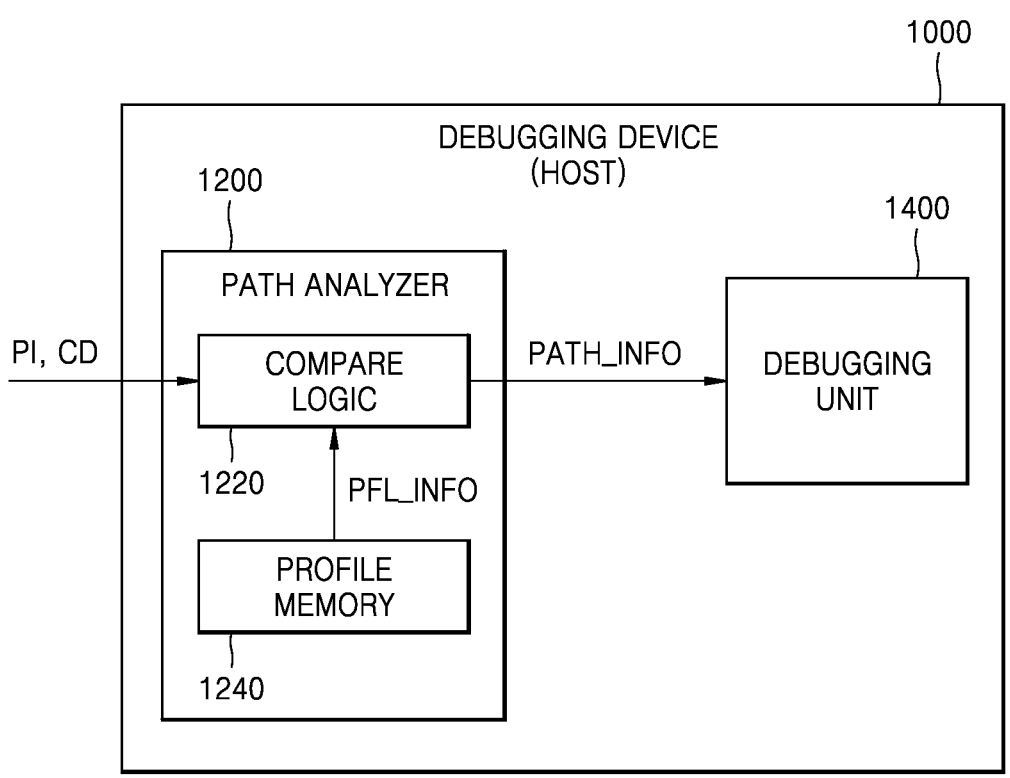
FIG. 11 is a view of a debugging device according to an example embodiment.

FIG. 11 is a view of the debugging device 1000 according to an example embodiment. The debugging device 1000 may include a path analyzer 1200 and a debugging unit 1400.

The path analyzer 1200 may receive the path identifier PI and the call depth CD from a core system outside the path analyzer 1200. The path analyzer 1200 may extract path information of called functions from the received path identifier PI and the call depth CD. The path analyzer 1200 may include a profile memory 1240 and a comparison logic unit 1220.

The profile memory 1240 may store profile information PFL_INFO that matches the path information of the called functions with the path identifier PI and the call depth CD. The debugging device 1000 may store the profile information PFL_INFO in the profile memory 1240 using functions used in a core in a core system and an address of a location where the functions are stored in advance before performing a debugging operation. The profile memory 1240 may be implemented as a part of any storage space in the debugging device 1000. The profile information PFL_INFO stored in the profile memory 1240 will be described in more detail with reference to FIG. 12.

The comparison logic unit 1220 may receive the path identifier PI and the call depth CD from a debugging logic unit in the core system and may receive the profile information PFL_INFO from the profile memory 1240. The comparison logic unit 1220 may compare the received path identifier PI and the call depth CD with the profile information PFL_INFO to extract function path information PATH_INFO matching the received path identifier PI and the call depth CD. The comparison logic unit 1220 may provide the function path information PATH_INFO to the debugging unit 1400.

The debugging unit 1400 may receive the function path information PATH_INFO from the path analyzer 1200. The debugging unit 1400 may perform a debugging operation using the function path information PATH_INFO received from the path analyzer 1200.

As such, the debugging device 1000 may extract the function path information PATH_INFO of called functions from a core using the received path identifier PI and the call depth CD, which are simplified information, by storing the profile information PFL_INFO.

Figure 12:
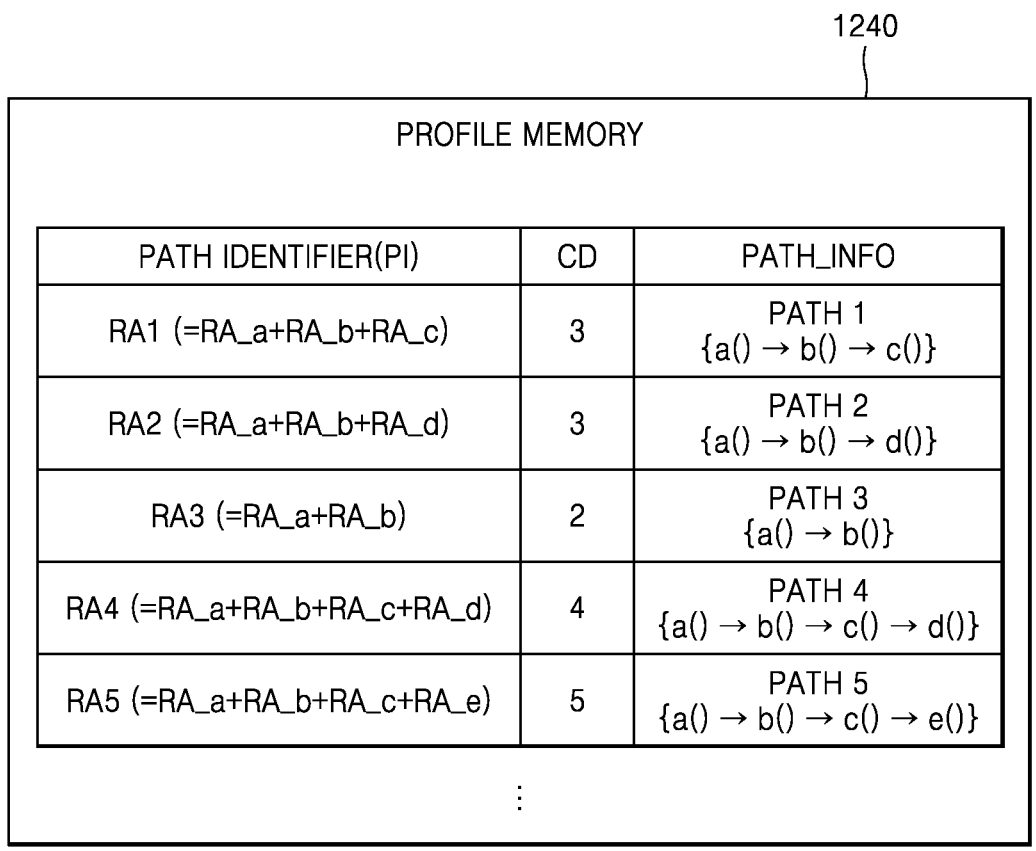
FIG. 12 is a view of a profile memory according to an example embodiment.

FIG. 12 is a view of the profile memory 1240 according to an example embodiment.

The profile memory 1240 may be a memory in which a debugging device stores profile information using functions used in a core in a core system and an address of a location where the functions are stored in advance. The profile memory 1240 may be part of any storage space in the debugging device.

The profile information may include information that matches function path information PATH_INFO and the path identifier PI and the call depth CD. For example, the profile information may store a path identifier PI and a call depth CD that match the first to fifth paths PATH_1 to PATH_5, respectively. For example, a path identifier PI corresponding to the first path PATH_1 in which a c( ) function is called after the call of a b( ) function after the call of an a( ) function may store a value RA equal to a sum of an a( ) function return address RA_a, a b( ) function return address RA_b, and a c( ) function return address RA_c, and the call depth CD corresponding to the first path PATH_1 may store 3, which is the number of the called functions. It can be understood with reference to the table of FIG. 12 that the second to fifth paths PATH_2 to PATH_5 are also stored in the same manner.

The debugging device may store the profile information as described above. Even if the debugging device receives only the path identifier PI and the call depth CD, which are simplified data, the debugging device may extract the function path information PATH_INFO of called functions through a matching operation with the profile information and use the function path information PATH_INFO for a debugging operation.

Figure 13:
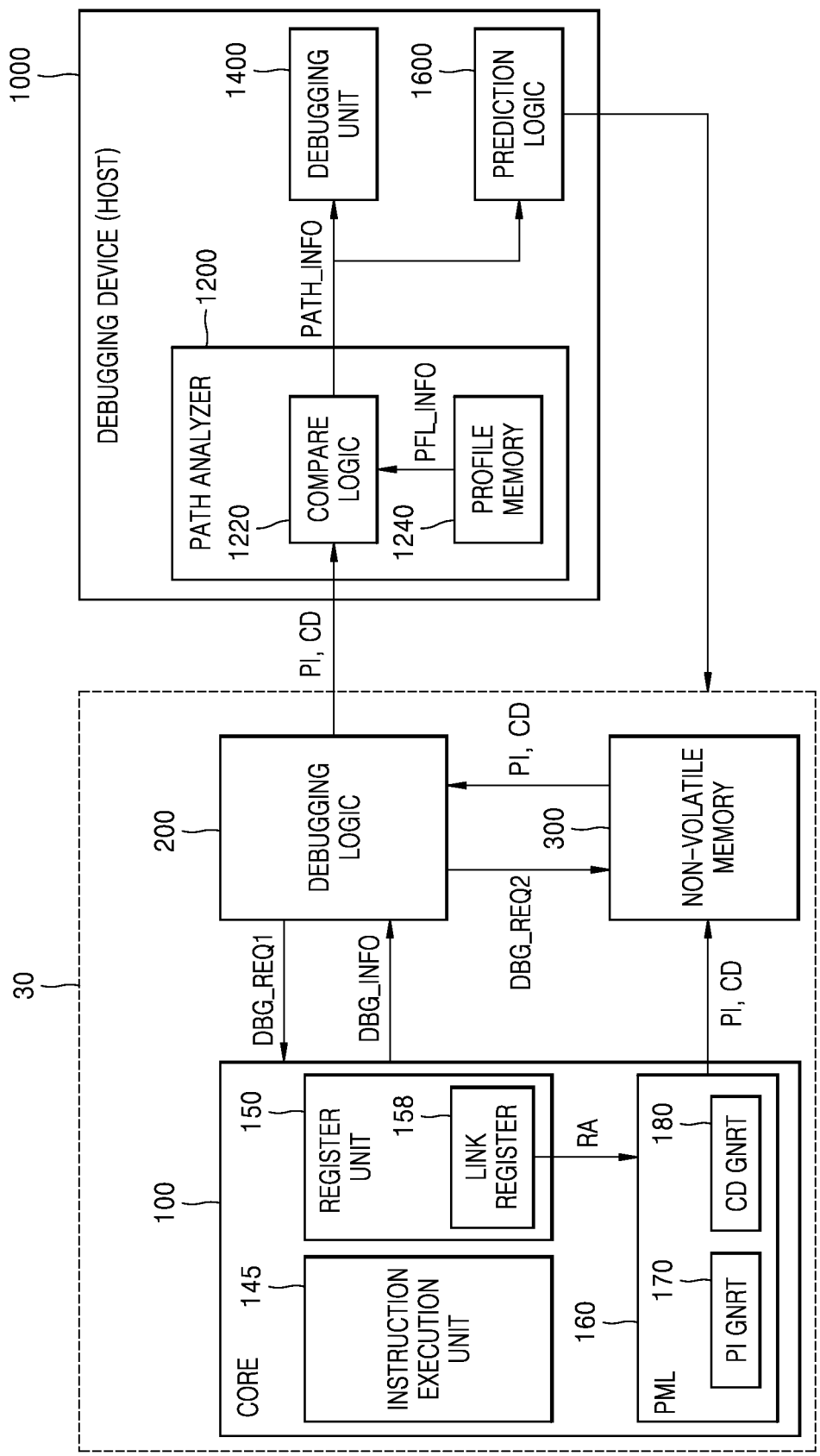
FIG. 13 is a view of a core system and a debugging device according to an example embodiment.

FIG. 13 is a view of a core system 30 and the debugging device 1000 according to an example embodiment. The core system 30 may include the core 100, the debugging logic unit 200, and the non-volatile memory 300, and may further include a volatile memory 300. The debugging device 1000 may include the path analyzer 1200 and the debugging unit 1400, and may further include a prediction logic unit 1600. Repeated descriptions of the core system 30 and the debugging device 1000, which are the same as those of FIGS. 1 to 12, will not be given herein.

The path analyzer 1200 may obtain the profile information PFL_INFO of called functions by matching a path identifier PI and a call depth CD received from the core system 30 with the profile information PFL_INFO stored in the profile memory 1240, and the debugging unit 1400 may perform a debugging operation on instruction execution of the core 100 using the function path information PATH_INFO.

The path analyzer 1200 may also provide the obtained function path information PATH_INFO to the prediction logic unit 1600. The prediction logic unit 1600 may use the function path information PATH_INFO of the called functions to predict information of functions to be called later. There are various ways to call functions, but the sequence of instructions executed by the core 100 may have a typical pattern. Thus, when executing instructions of a typical pattern, it may be possible to predict functions or instructions to be called later based on the function path information PATH_INFO that have been called. The prediction logic unit 1600, if the called function path information PATH_INFO matches a specific pattern, may predict the function or instructions to be called later and may provide the predicted information to the core system 30.

As such, if the debugging device 1000 obtains the function path information PATH_INFO using the path identifier PI and the call depth CD, the debugging device 1000 may debug both the function path information PATH_INFO and a function or an instruction to be executed after a function that was called until a time when the debugging device 1000 obtains the function path information PATH_INFO.

Figure 14:
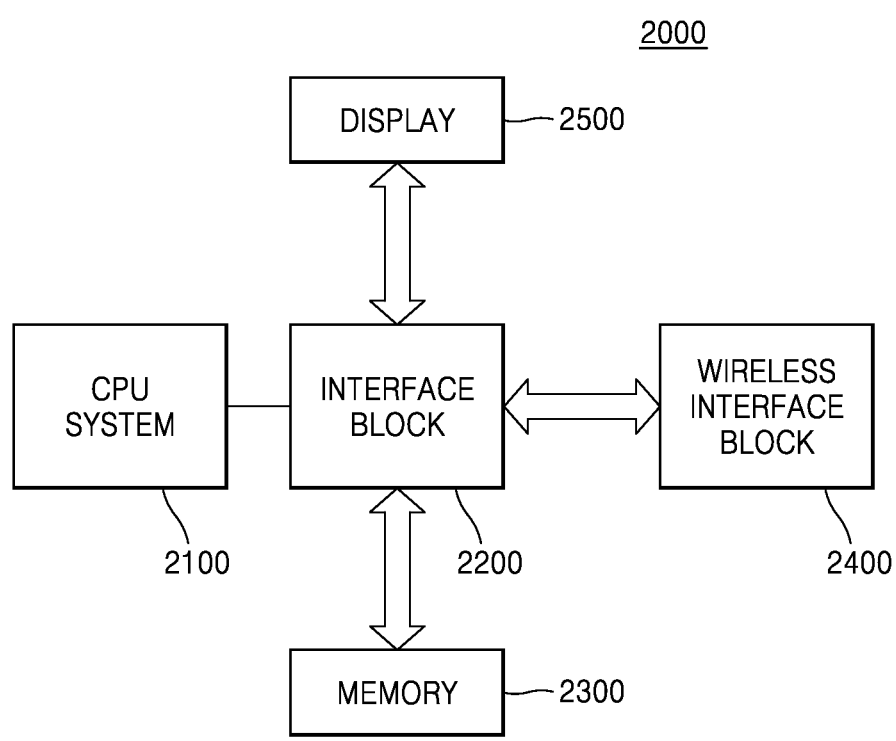
FIG. 14 is a view of a computing platform according to an example embodiment.

FIG. 14 is a view of a computing platform 2000 according to an example embodiment. The computing platform 2000 may include a central processing unit (CPU) system 2100, an interface block 2200, a memory device 2300, a wireless interface block 2400, and a display 2500.

The CPU system 2100 may communicate with the memory device 2300, the wireless interface block 2400, or the display 2500 via the interface block 2200. The CPU system 2100 may be a system including the core 100, the debugging logic unit 200, and the volatile memory 400 of FIG. 1. In addition, the CPU system 2100 may manage information on a path identifier and a call depth including path information on functions called during instruction execution of a CPU, and when a backup event occurs, may store the backup event in the memory device 2300 through the interface block 2200. The CPU system 2100 may be a single device, such as an application processor.

The interface block 2200 may include one or more circuit blocks capable of performing various interface control functions. The control functions may include memory access control, graphic control, input/output interface control, or wireless network access control.

Each of the circuit blocks may be a separate independent chip, implemented as a portion of the CPU system 2100, or a separate block in the CPU system 2100. The memory device 2300 may exchange data with the CPU system 2100 via the interface block 2200. The wireless interface block 2400 may connect the computing platform 2000 to a wireless network, such as a mobile communication network or a wireless local area network (LAN), via an antenna.

While aspects of example embodiments been particularly shown and described above, it will be understood that various changes in form and details may be made therein without departing from the spirit and scope of the following claims.

What is claimed is:

1. A method of executing an instruction of a core, the method comprising:
    calling a first function;
    setting a path identifier about a call depth indicating a number of called functions and path information of called functions using a first function return address corresponding to where the first function ends and returns to;
    calling a second function in the first function;
    updating the path identifier using a second function return address corresponding to where the second function ends and returns to;
    storing the path identifier in a non-volatile memory; and
    extracting the path information by comparing each of the path identifier and the call depth with a profile stored in a debugging device.

2. The method of claim 1, wherein the updating of the path identifier comprises performing an arithmetic operation on the path identifier and the second function return address.

3. The method of claim 2, wherein the arithmetic operation comprises adding the second function return address to the path identifier.

4. The method of claim 1, further comprising increasing the call depth by 1 after calling the second function.

5. The method of claim 4, wherein the path identifier is stored in the core, and
wherein the method further comprises storing the path identifier stored in the core in the non-volatile memory in response to a backup event in the core.

6. The method of claim 5, wherein the backup event occurs in response to an exception in the core.

7. The method of claim 5, wherein the backup event occurs in response to a leaf function ending after being called without calling another function.

8. The method of claim 5, wherein the call depth is stored in the core, and
wherein the method further comprises storing the call depth in the non-volatile memory in response to the backup event.

9. The method of claim 4, further comprising:
ending the second function;
updating the path identifier based on the second function return address; and
decreasing the call depth by 1.

10. The method of claim 1, further comprising:
storing the second function return address in a link register of the core; and
storing the second function return address in a volatile memory.

11. A core system comprising:
a core configured to execute instructions and update a path identifier including path information of called functions and a call depth indicating a number of called functions based on a first function being called;
a non-volatile memory configured to store the path identifier, the call depth and data for executing the instructions; and
a debugging logic unit configured to access the non-volatile memory and read the path identifier in a debugging mode,
wherein the core is further configured to store the path identifier and the call depth in the non-volatile memory in response to a backup event, and wherein the path information is extracted by comparing each of the path identifier and the call depth with a profile stored in a debugging device.

12. The core system of claim 11, wherein the path identifier stored in the non-volatile memory indicates a sum of a plurality of return addresses of functions called prior to the backup event.

13. The core system of claim 12, wherein the backup event occurs in response to an exception in the core.

14. The core system of claim 12, wherein the backup event occurs in response to a leaf function ending after being called without calling another function.

15. The core system of claim 12, wherein the call depth indicates a number of functions called prior to the backup event.

16. The core system of claim 15, wherein the core comprises:
a path identifier generator configured to update the path identifier based on a PC value in the core and the plurality of return addresses of functions; and
a call depth generator configured to update the call depth based on the PC value in the core.

17. The core system of claim 15, wherein, the core is further configured to subtract a first return address indicating a first function end address corresponding to where the first function ends and returns from the path identifier and decrease the call depth by 1 in response to the first function ending.

18. A method of debugging a core system of a debugging device, the method comprising:
transmitting, to the core system, a debugging control signal requesting debugging information;
receiving, from the core system, a call depth indicating a number of called functions;
receiving, from the core system, a path identifier including function path information corresponding to functions called by the core system; and
comparing each of the path identifier and the call depth received from the core system with a profile stored in the debugging device, and
extracting the function path information from the path identifier based on the comparing.

19. The method of claim 18, wherein the profile includes a table matching the path identifier with the function path information.

20. The method of claim 18, further comprising increasing the call depth by one after calling each of the number of called functions.

* * * * *